Figure 1:
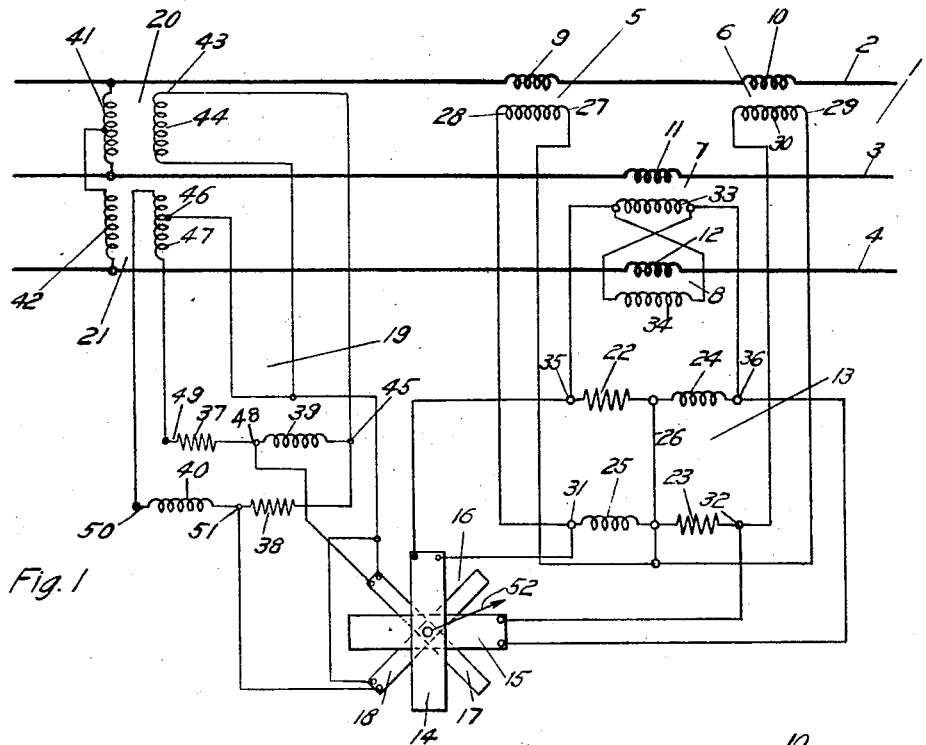

Feb. 2, 1926.

A. NYMAN 1,571,910

ELECTRICAL MEASURING SYSTEM

Filed Nov. 5, 1920

WITNESSES:
K. C. Clowes.
J. E. Foster

INVENTOR
Alexander Nyman
BY
Wesley G. Carr
ATTORNEY

Patented Feb. 2, 1926.

1,571,910

UNITED STATES PATENT OFFICE.

ALEXANDER NYMAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING SYSTEM.

Application filed November 5, 1920. Serial No. 422,025.

*To all whom it may concern:*

Be it known that I, ALEXANDER NYMAN, a citizen of the United States, and a resident of Wilkinsburg, in the county of Allegheny and State of Pennsylvania, have invented a new and useful Improvement in Electrical Measuring Systems, of which the following is a specification.

My invention relates to measuring instruments and particularly to phase meters for polyphase electric circuits.

One object of my invention is to provide a power factor meter that shall operate correctly, irrespective of the unbalance of the circuit to which it is connected.

Another object of my invention is to provide a static network that shall be disposed between a measuring instrument and a circuit to supply out-of-phase components of the positive or negative phase-sequence components of electrical quantities to the windings of the instrument.

A further object of my invention is to provide a device of the above indicated character that shall be simple and inexpensive to construct and effective in its operation.

Mr. Charles Fortescue, in his article on "Symmetrical co-ordinates" in the Transactions of the American Institute of Electrical Engineers of 1918, page 1027, shows that the electrical quantities in an unbalanced three phase three-conductor circuit may be resolved into two symmetrical systems of reversed phase sequence. Thus, an unbalanced system of voltages may be resolved into a balanced system or component having a positive phase sequence corresponding to the order of phase rotation of the system and into a balanced system or component having a negative phase sequence relative to the order of phase rotation of the system.

In my co-pending application, Serial No. 396,529, filed July 15, 1920, I have shown that a plurality of current transformers connected in a three phase system may be connected to a resistor and a reactor or other phase-shifting means to sift out the negative phase sequence components of an unbalanced system of currents and to establish a potential difference between two predetermined points of the network constituted thereby, that shall be proportional to the value of the positive phase-sequence components of such unbalanced currents.

In order to obtain two potential differences each of which shall be proportional to the positive phase-sequence component and spaced 90 electrical degrees from the other, I provide what constitutes in effect two networks, but energize them both from the same set of current transformers. I thus procure the desired proportional potential differences in a manner similar to that shown in my co-pending application referred to above.

In practicing my invention, I provide a plurality of series transformers and a plurality of resistors and reactors which are so connected to the transformers and to two of the current windings of an ordinary four-coil power-factor meter that the two windings are supplied with currents proportional to the positive phase-sequence component of the current traversing the circuit but 90° out of phase with respect to each other. Similarly, the voltage transformers are connected to reactors and resistors in such manner that the two potential windings of a power-factor meter are supplied with currents proportional to the positive phase-sequence component of the voltage traversing the circuit but 90° out of phase with respect to each other. With this arrangement, the movable lever of the power-factor meter will be actuated to show the phase relationship between the positive phase-sequence component of the current and the positive phase-sequence component of the voltage or, in other words, the power factor of the polyphase circuit, irrespective of the unbalance of the current voltage or power traversing that circuit.

Mr. Carl T. Fechheimer, in his article on "Power factor and unbalance on a polyphase system" at page 99 of his paper which was presented at the convention of the American Institute of Electrical Engineers June 29, 1920 to July 2, 1920, shows that the power factor of the positive sequence components of current and of voltage corresponds to the power factor of an unbalanced polyphase circuit in such manner as to meet the definition of power factor in a single-phase circuit. In that article it is pointed out that power factor and unbalance are independent characteristics of a polyphase system, and that the definition of power factor proposed therein is independent of unbalance.

The definition of "power factor" in this article, and, consequently, the definition of "power factor" used in my invention is the ratio of the true watts to the volt-amperes in the balanced positive sequence systems.

In the system of power factor measurement which I have herein set forth, I employ the above definition as a guide of the requirements of power factor measurements in a polyphase system.

Figure 2:
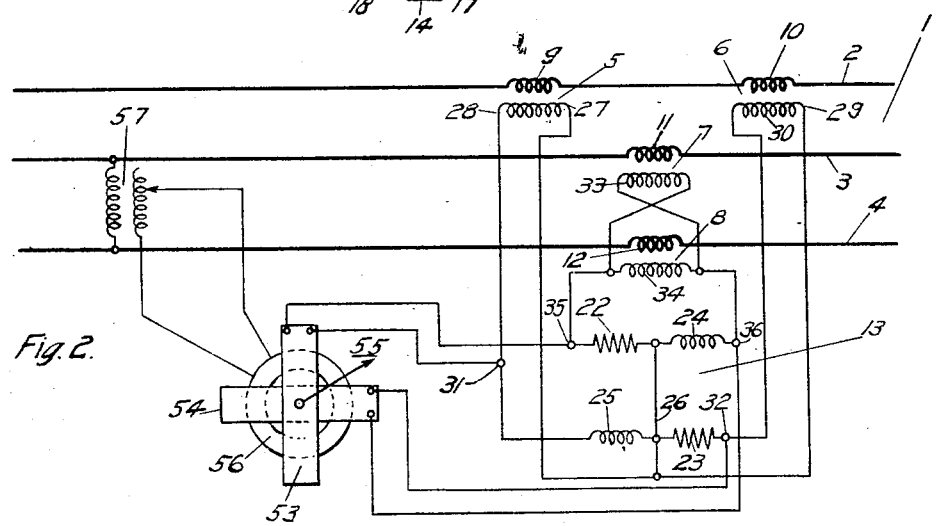

Figure 1 of the accompanying drawings is a diagrammatic view of an electrical circuit embodying my invention, and Fig. 2 is a diagrammatic view of an electrical circuit embodying a modified form of my invention.

An electric circuit 1, comprising three conductors 2, 3 and 4, is provided with four series transformers 5, 6, 7 and 8, the primary windings 9 and 10 of the transformers 5 and 6 being connected in series with the conductor 2, the primary winding 11 of the transformer 7 being connected in series with the circuit 3 and the primary winding 12 of the transformer 8 being connected in series with the conductor 4. A static network 13 is connected between the transformers 5, 6, 7 and 8 and the current windings 14 and 15 of a four-coil phase meter 16. The potential coils 17 and 18 of the meter 16 are connected, through a static network 19, to two potential transformers 20 and 21. The network 13 comprises two resistors 22 and 23 and two reactors 24 and 25, all of equal impedance. The characteristics of the reactors 24 and 25 are such as to cause the currents traversing the same to lag 90° behind an impressed electromotive force, while current traversing the resistors 22 and 23 would be in phase with the applied voltage.

A conductor 26 connects one terminal of each of the resistors and reactors and is connected to one terminal 27 of the secondary winding 28 of the transformer 5 and one terminal 29 of the secondary winding 30 of the transformer 6. The other terminal of the winding 28 is connected to the terminal 31 of the reactor 25, and the other terminal of the winding 30 is connected to the terminal 32 of the resistor 23. The secondary windings 33 and 34 of the transformers 7 and 8 are oppositely connected, and the circuit, thus constituted, is connected across terminals 35 and 36 of the resistor 22 and reactor 24, respectively. The winding 14 of the phase meter 16 is connected from the terminal 31 of the reactor 25 to the terminal 35 of the resistor 22 and, similarly, the winding 15 is connected, from the terminal 32 of the resistor 23 to the terminal 36 of the reactor 24.

When the currents traversing the conductors 2, 3 and 4 are balanced, the voltages across the terminals of the transformer windings 33 and 34, and the sum of the voltages of the windings 28 and 30, are equal but displaced 90°. Thus, the currents that traverse the resistor 22 will be in phase with those traversing the reactor 25 and consequently, under balanced current conditions in the circuit, current proportional to the positions phase-sequence component traverses the meter winding 14. Similarly the current traversing the resistor 23 is in phase with that traversing the reactor 24 and current proportional to the positive phase-sequence component traverses the winding 15.

However, when the currents traversing the conductors 2, 3 and 4 are unbalanced currents will traverse the windings 14 and 15 that are 90° out of phase with respect to each other. Under either balanced or unbalanced conditions, these currents have been found to be proportional to the positive phase-sequence currents. In other words, the drops in potential across the resistors 22 and 23 and the reactors 24 and 25 are such and they are arranged in such manner that the negative phase-sequence component of the current is cancelled to cause current to traverse the windings 14 and 15 in accordance with the positive phase-sequence component only of the current traversing the circuit 1. The current traversing the windings 14 and 15 will be, however, 90° out of phase with each other and thus the instrument 16 will be supplied with a rotating magnetic field which will be proportional to the positive phase sequence component of the current traversing the circuit 1.

The static network 19 comprises resistors 37 and 38 and reactors 39 and 40. The primary winding 41 of the transformer 20 are connected across the conductors 2 and 3, and the primary winding 42 of the transformer 21 is connected from the conductor 4 to a point intermediate the ends of the winding 41 or, in other words, the transformers 20 and 21 are T-connected to the circuit. The terminal 43 of the secondary winding 44 of the transformer 20 is connected to the terminals 45 of the reactor 39 and the resistor 38. The other terminal of the winding 44 is connected to a point 46 intermediate the ends of the secondary winding 47 of the transformer 21 and also to one terminal of the winding 17 of the meter 16. The other terminal of the winding 17 of the meter is connected to a terminal 48 between the resistor 37 and reactor 39. One terminal of the winding 47 of the transformer 21 is connected to the terminal 49 of the resistor 37 and the other terminal of the winding is connected to the terminal 50 of the reactor 40. The point 51 between the react 40 and resistor 38 is connected to one terminal of the meter 16, and the other terminal of that winding is connected to the point 46 intermediate the ends of the secondary winding 47 of the transformer 21.

The resistors 37 and 38 and the reactors 39 and 40 are of equal impedances but they are so connected to the transformers that, under balanced voltage conditions in the circuit 1, the current traversing the reactor 40 is 180° out of phase with that traversing the resistor 38 and, consequently, no current traverses the winding 18. Similarly, under balanced voltage conditions in the circuit 1, the current traversing the resistor 37 is 180° out of phase with the current traversing the reactor 39 and no current traverses the meter winding 17.

However, when the voltage of the circuit 1 is unbalanced, the potential drops across the resistors and reactors of the network 19 are such and they are so arranged that the negative phase-sequence component is cancelled to cause the windings 17 and 18 to be supplied with current proportional to the positive phase-sequence component only of the voltage impressed on the circuit 1 but these currents will be 90° out of phase with respect to each other.

If the meter 16 is provided with a rotating field induced by positive phase-sequence components of the currents and a rotating field induced by positive phase-sequence components of the voltage, the movable member thereof, which is usually in the form of an iron vane, will be actuated to move the pointer 52 to a position which shows the phase relationship of the positive phase-sequence components of the voltage and current, and, consequently, the power factor of the circuit, irrespective of the unbalanced condition of the currents and voltages on the circuit 1.

In Fig. 2 of the drawings, a network 13, similar to that set forth with respect to Fig. 1, is connected to the circuit 1 and the current windings 53 and 54 of a three-coil phase meter 55. A potential coil 56 of the meter 55 is connected across one phase of the circuit 1 through a potential transformer 57. With this arrangement, it is unnecessary to provide the network 19 and a very much simpler device is obtained. However, such a system is not accurate unless the voltages of the circuit are balanced.

My invention is not limited to the specific type of phase meter employed or to the specific static network, as various modifications may be made in my invention without departing from the spirit and scope of the same, as set forth in the appended claims.

I claim as my invention:

1. The combination with a three-phase electric circuit and a power-factor meter, of means connected between the circuit and the current coils of the meter for causing each of the coils to be traversed by current proportional to the positive phase-sequence component of the currents traversing the circuit but out of phase with respect to each other.

2. The combination with a three-phase electric circuit and a power-factor meter, of means connected between the circuit and the current coils of the meter for causing each of the coils to be traversed by current proportional to the positive phase-sequence component of the currents traversing the circuit but 90 degrees out of phase with respect to each other.

3. The combination with a three-phase electric circuit and a power-factor meter, of means connected between the circuit and the current coils of the meter for causing the coils to be traversed by currents proportional to the positive phase-sequence component of the currents traversing the circuit but out of phase with respect to each other, and means connected between the circuit and the potential coils of the meter for causing the coils to be traversed by currents proportional to the positive phase-sequence component of the voltages of the circuit.

4. The combination with a three-phase electric circuit and a power-factor meter, of means connected between the circuit and the current coils of the meter for causing the coils to be traversed by currents proportional to the positive phase-sequence component of the currents traversing the circuit but out of phase with respect to each other, and means connected between the circuit and the potential coils of the meter for causing the coils to be traversed by currents proportional to the positive phase-sequence component of the voltages of the circuit but out of phase with respect to each other.

5. The combination with a polyphase circuit and two windings, of static means comprising resistors and reactors connected between the circuit and the windings and having such characteristics that the windings are traversed by out-of-phase currents proportional to components of the positive phase-sequence components of the currents of the circuit.

6. The combination with a polyphase circuit and a phase meter having a plurality of current windings, of means energized from the circuit and comprising resistors and reactors for supplying the windings of the phase meter with out-of-phase currents proportional to the positive phase-sequence component of the currents in the circuit.

7. The combination with a three phase system and current transformers connected in each phase thereof, of a network comprising resistive and reactive means and means for connecting the current transformers to the network to establish potential differences between predetermined points of the network that shall be proportional to a symmetrical component of an unbalanced quantity in the system and that shall bear predetermined phase-angular relations.

8. The combination with a three phase system and current transformers connected in each phase thereof, of a network comprising resistive and reactive means, means for connecting the current transformers to the network to establish potential differences between predetermined points of the network that shall be proportional to a symmetrical component of unbalanced currents in the system and that shall bear predetermined phase-angular relations and an instrument connected to said predetermined points.

9. The combination with a three phase system and current transformers connected in each phase thereof, of a network comprising resistive and reactive means, means for connecting the current transformers to the network to establish potential differences between predetermined points of the network that shall be proportional to the value of the positive phase-sequence component of a system of unbalanced currents and that shall bear predetermined phase-angular relations and a phase meter having a plurality of current windings connected to said predetermined points.

10. The combination with a three phase circuit and a power factor meter, of a network comprising resistive and reactive means, means for connecting the network to the circuit to establish potential differences between predetermined points of the network that shall be proportional to the positive phase-sequence component of current and that shall bear an out-of-phase angular relationship, means for connecting the current windings of the meter between said predetermined points, a second network, means for connecting the same to the circuit to establish out-of-phase potential differences between predetermined points of said network that shall be proportional to the positive phase-sequence component of voltage and means for connecting the voltage windings of the meter to said predetermined points.

In testimony whereof, I have hereunto subscribed my name this 25th day of October, 1920.

ALEXANDER NYMAN.